(12) United States Patent
Eichenberger et al.

(10) Patent No.: US 8,212,774 B2
(45) Date of Patent: *Jul. 3, 2012

(54) COLLAPSIBLE WIRELESS INPUT DEVICE

(75) Inventors: Pascal Eichenberger, Lausanne (CH);
Yves Karcher, Cully (CH); Charles Seiber, Belmont, CA (US); Denis O'Keeffe, Newmarket (IE); Martin Gleeson, County Cork (IE)

(73) Assignee: Logitech Europe S.A., Morges (CH)

( * ) Notice: Subject to any disclaimer, the term of this patent is extended or adjusted under 35 U.S.C. 154(b) by 470 days.

This patent is subject to a terminal disclaimer.

(21) Appl. No.: 12/393,879

(22) Filed: Feb. 26, 2009

(65) Prior Publication Data

US 2009/0213076 A1 Aug. 27, 2009

Related U.S. Application Data

(63) Continuation of application No. 10/819,702, filed on Apr. 6, 2004, now Pat. No. 7,499,028.

(51) Int. Cl.
*G09G 5/08* (2006.01)

(52) U.S. Cl. ........ 345/163; 345/164; 345/157; 345/158; 345/166; 345/167

(58) Field of Classification Search ........... 345/156–163
See application file for complete search history.

(56) References Cited

U.S. PATENT DOCUMENTS

| | | | | |
|---|---|---|---|---|
| 5,260,696 A * | 11/1993 | Maynard, Jr. | ................. | 345/163 |
| 6,304,249 B1 * | 10/2001 | Derocher et al. | ............. | 345/163 |
| 6,331,850 B1 * | 12/2001 | Olodort et al. | ................ | 345/168 |
| 6,909,421 B2 * | 6/2005 | Wang | ............................ | 345/163 |
| 7,499,028 B2 * | 3/2009 | Eichenberger et al. | ....... | 345/163 |

* cited by examiner

*Primary Examiner* — Grant Sitta
(74) *Attorney, Agent, or Firm* — Kilpatrick Townsend & Stockton LLP

(57) ABSTRACT

An input device for inputting commands to a host computer includes a base. An upper housing defines a plurality of control buttons for inputting commands to the computer. The base and upper housing are movably coupled to each other to enable the mouse to be placed in a collapsed position and a raised position. A release button is configured to actuate and facilitate raising of the mouse from the collapsed position to the raised position, the raised position placing the mouse a suitable state for inputting commands to the computer using the control buttons.

19 Claims, 23 Drawing Sheets

COLLAPSIBLE WIRELESS INPUT DEVICE

CROSS-REFERENCES TO RELATED APPLICATIONS

This application is a continuation of U.S. application Ser. No. 10/819,702 filed Apr. 6, 2004 and entitled "Collapsible Wireless Input Device", the disclosure of which is incorporated herein by reference.

BACKGROUND OF THE INVENTION

The present application relates to a wireless input device for a host, e.g., a computer or gaming device (such as a Play Station™).

Computers have become ubiquitous in our society with the people's acceptance of the Internet. The computers are no longer primarily business machines. They have become an integral part of many people's personal lives. Many people now get their news and stock prices, make travel reservations, buy cars, manage bank accounts, and the like primarily using the computers.

To many, the computers have become an essential consumer product, due largely to the tremendous increase in their processing power over the past few decades. In addition to being more powerful, the computers are being made smaller and smaller. Portable Notebook computers now make up a significant percentage of all computers sold, some weighing no more than a few pounds. Notebooks have gained great popularity recently due to its portability.

Another recent trend involving the computers is the rising popularity of wireless input devices, e.g., keyboards and mice. These wireless devices have been very popular for those who want to minimize the clutter associated with wires attached to the conventional input devices. The wireless mouse has been particularly popular with the Notebook users since it is easier to carry around than a conventional mouse with wires.

Recently, Kensington has introduced a wireless mouse, i.e., PocketMouse™ Pro Wireless. The mouse has a storage compartment for storing a universal serial bus (USB) receiver within the mouse for user convenience. When the mouse is to be used, the USB receiver is removed from the compartment and inserted into a USB port of the computer. The introduced a wireless mouse with a compartment for carrying a USB receiver. These mice provide improved portability since the receivers can be stored within the mice and carried around when the mice are not in use.

Although these mice provide improved portability, they still can be somewhat troublesome when carrying them around. As with other mice, they have a "hump" on the upper side of the mice to ergonomically support the user's hand. Such a hump adds bulk to the mice. People, generally however, find that it is easier to carry around thinner devices. The thickness of the mouse makes it difficult to carry it around in a trip, particularly in a Notebook case, which fits flat objects better.

BRIEF SUMMARY OF THE INVENTION

The present invention relates to an input device for a host. The input device may be a mouse, trackball, remote control, presenter, and the like. The input device is configured to change in size, e.g., vertically or horizontally. For example, the input device may be opened/expanded when the device is in use for ergonomic reasons and closed/collapsed when the device is not in use for portability reasons. Alternatively, a given set of functions of the input device may be associated with its opened or closed state, e.g., the input device functions as a mouse in opened state and as a presenter in a closed state.

In one embodiment, a mouse for inputting commands to a host computer includes a base. An upper housing defines a plurality of control buttons for inputting commands to the computer. The base and upper housing are movably coupled to each other to enable the mouse to be placed in a collapsed position and a raised position. A release button is configured to actuate and facilitate raising of the mouse from the collapsed position to the raised position. In one implementation, the raised position places the mouse in a suitable state for inputting commands to the computer using the control buttons. In another implementation, the mouse is configured to input commands to the computer in both the raised and collapsed positions, where the raised position provides means of removing a component, e.g., a dongle, housed within the mouse.

In another embodiment, a wireless mouse for inputting commands to a host computer includes a base; an upper housing defining a plurality of control buttons for inputting commands to the computer, the base and the upper housing defining a compartment within the mouse, the base and upper housing being movably coupled with each other to enable the mouse to be placed in a collapsed position and a raised position; and a release button configured to facilitate raising of the mouse from the collapsed position to the raised position, the raised position placing the mouse a suitable state for inputting commands to the computer using the control buttons.

In yet another embodiment, a method of inputting commands to a host computer using a wireless input device includes actuating a release button on a wireless mouse to raise the mouse from a collapsed position to a raised position, the mouse being configured to store a receiver in a compartment defined within the mouse; removing the receiver from the compartment via an opening that is exposed on one side of the mouse, the opening being exposed as a result of the mouse being raised to the raised position; inserting the receiver into a port of the computer; and inputting commands to the computer using the mouse via the receiver that is inserted into the port of the computer.

DETAILED DESCRIPTION OF THE INVENTION

Figure 1:
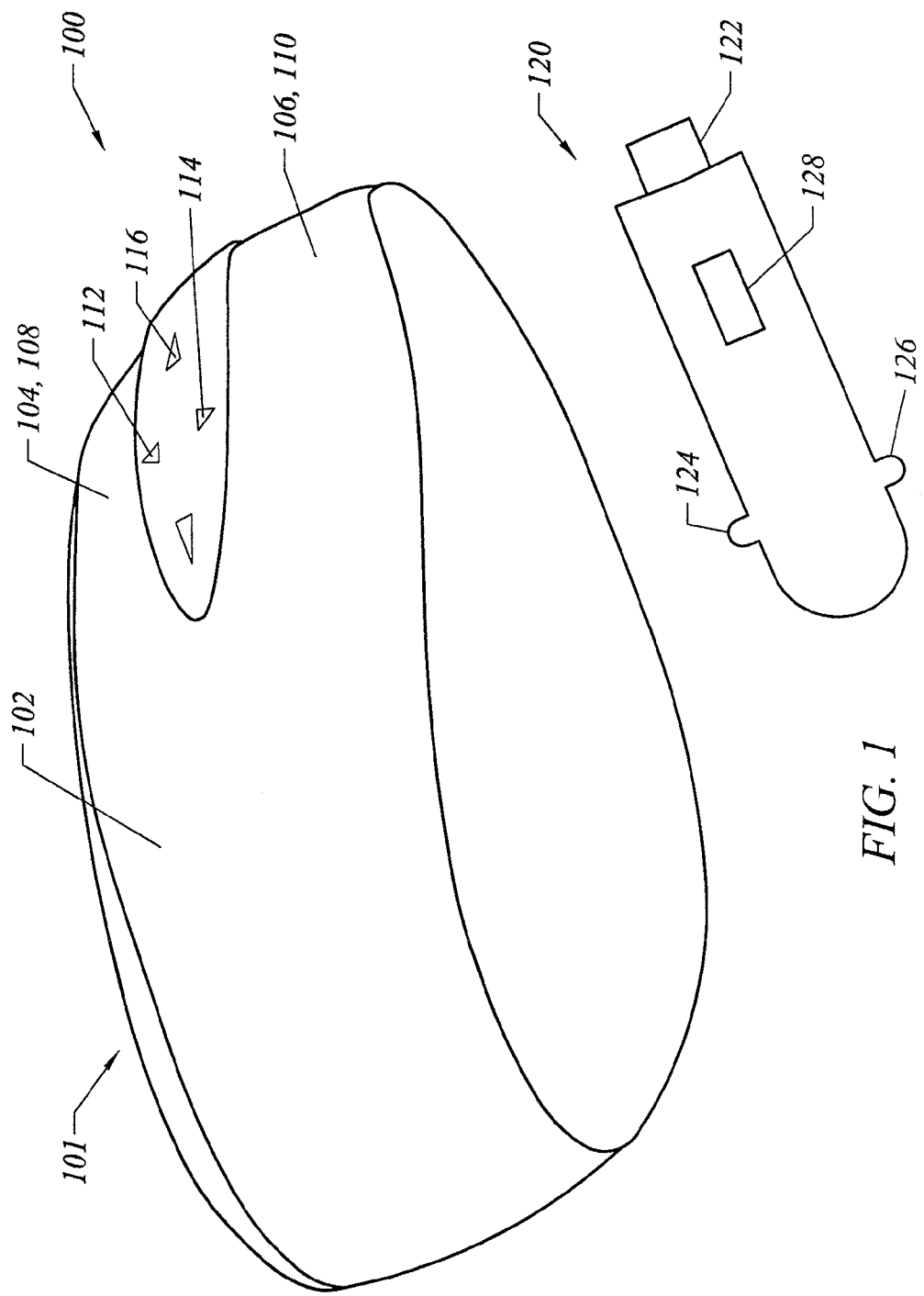
FIG. 1 illustrates a wireless mouse that is configured to have a movable, upper housing according to one embodiment of the present invention.

FIG. 1 illustrates an input device, e.g., wireless mouse, 100 that is configured to have a movable, upper housing 101 according to one embodiment of the present invention. The movable upper housing enables the mouse to have at least two different shapes: (1) a collapsed position (or inactive state) for easy portability and (2) a raised position (or active state) for ergonomic usage of the mouse. In one implementation, the mouse may be in an active state in both raised and collapsed positions.

The upper housing includes an upper cover 102. A left select button 104 and right select button 106 are provided at the front of the mouse. The left and right select buttons are activated by clicking on a left portion 108 and a right portion 110 of the upper cover. The left and right portions are a unitary structure in the present embodiment.

The mouse 100 includes a left horizontal zone 112, a right horizontal zone 114, and a vertical region 116. Touching or pressing the left horizontal zone causes panning to the left of the document being displayed on the monitor. Touching or pressing the right horizontal zone causes panning to the right of the document being displayed. The document being displayed may be moved up or down using the vertical region 116. In one embodiment, the vertical movement may be controlled by the movement of a finger or stylus up and down along the vertical region. In another embodiment, the vertical region includes an up button to scroll up and a down button to scroll down. The zones 112 and 114 and vertical region 116 may be made from a single touchpad. In other implementations, these zones and region may be implemented by using a mechanical system including movable mechanical components, e.g., a roller or wheel.

FIG. 1 also shows a receiver 120 that is configured to cooperate with the mouse in inputting commands to the computer. The receiver 120 is configured to be connected to one of the ports provided on the computer, so that the mouse may communicate wirelessly with the computer. The receiver 120 is a USB receiver or dongle in the present embodiment. The USB receiver 120 includes a connector 122 that is designed to be inserted into the USB port. In other implementations, other types of wireless transmission technologies are used, e.g., 27 MHz or Bluetooth™. In the present embodiment, Bluetooth™ or 27 MHz (or other) are used to communicate between the mouse and the dongle, whereas USB or PS2 (or other) are used to communicate between the dongle and the computer. Alternatively, a transmitter or transceiver within the mouse may communicate directly with a built-in receiver, e.g., a Bluetooth™ hub, in a host device, thereby eliminating the need to use a dongle as a receiver.

In the present embodiment, the receiver is configured to be carried inside of the mouse for easy portability. The receiver is taken out of the mouse when the user wishes to use the mouse. The receiver 120 includes first and second extensions 124 and 126 on the left and right sides of the receiver. The extensions 124 and 126 are configured to cooperate with other components of the mouse to facilitate the movement of the upper housing 101, as will be explained below.

In one embodiment, the receiver 120 includes a memory 128 for storing data. The memory 128 is preferably a non-volatile semiconductor device. In another embodiment, the receiver includes an access key for accessing protected computer resources.

Figure 2:
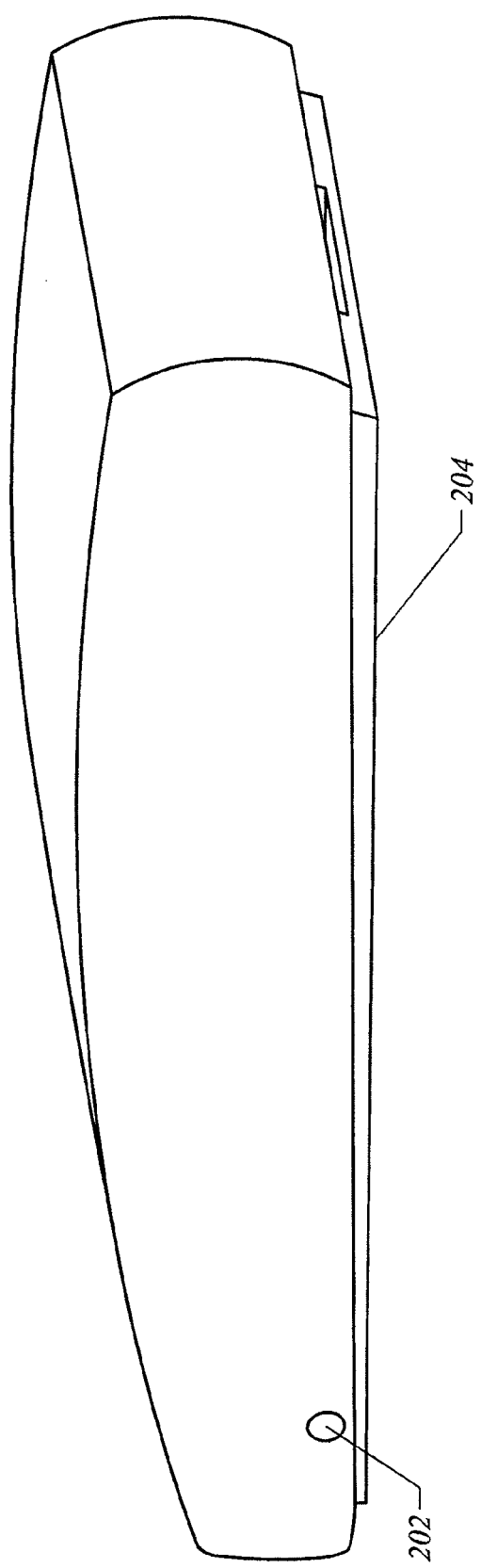
FIG. 2 illustrates a side view of the wireless mouse according to one embodiment of the present invention.

FIG. 2 illustrates a side view of the wireless mouse 100 according to one embodiment of the present invention. The mouse includes a pivot point 202 provided at front side of the mouse. The entire upper housing 101, including the buttons, pivots about the point 202 to raise the upper housing upward from a base 204 of the mouse or lower the upper housing downward to the base 204. The mouse is raised upward (or in a raised position) if the mouse is to be activated and used by the user to input commands to the computer.

FIG. 2 illustrates the mouse in a collapsed position. The mouse is lowered or collapsed if the mouse is to be deactivated and not to be used to input commands to the computer in the present embodiment. The raised state or position is configured to provide a hump or add bulk to the mouse, so that it may be used more ergonomically by the user. The collapsed position or state is configured to reduce the bulk of the mouse and make it thinner for easy portability.

Figure 3:
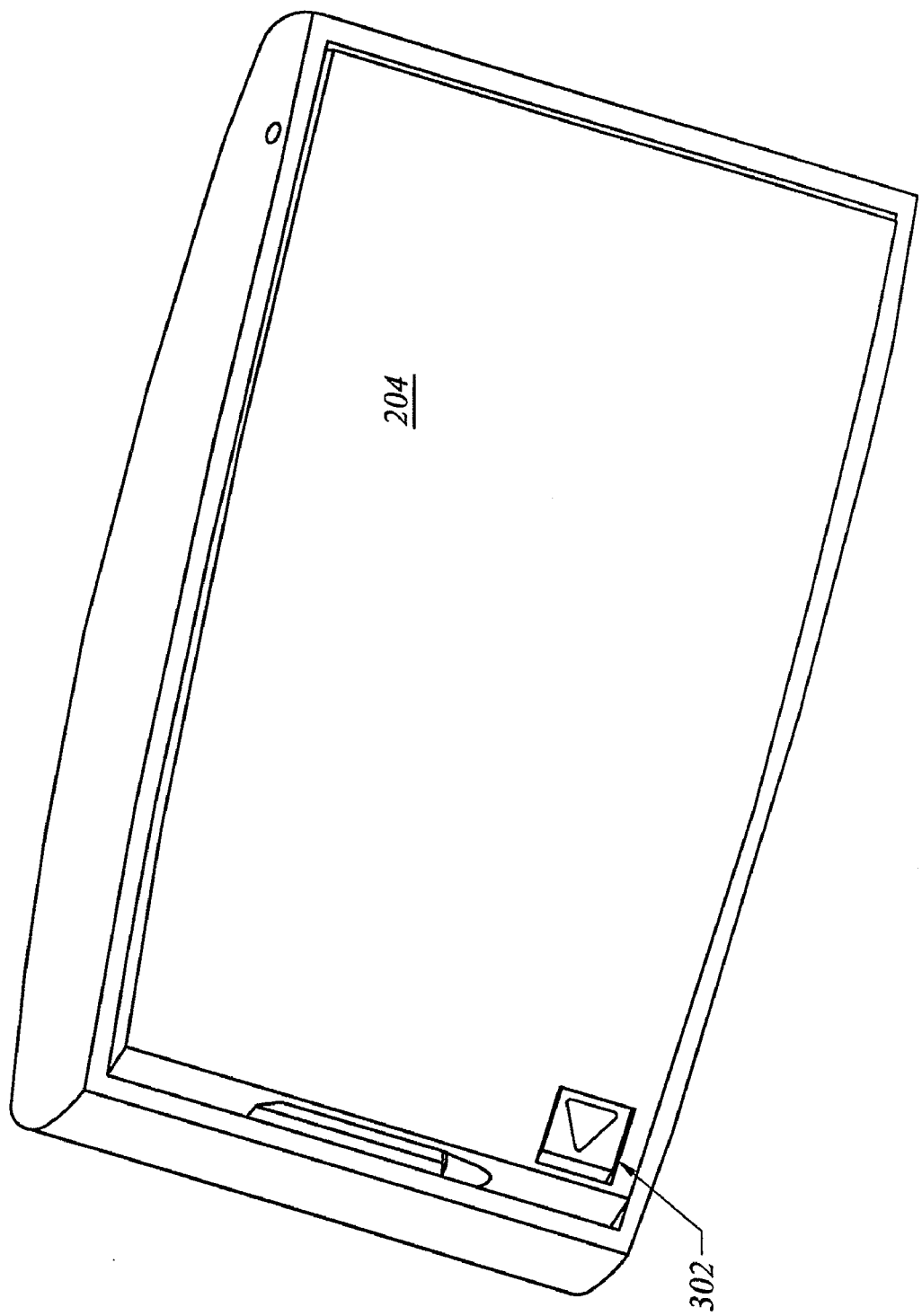
FIG. 3 illustrates a bottom view of the mouse according to one embodiment of the present invention.

FIG. 3 illustrates a bottom view of the mouse 100 according to one embodiment of the present invention. A release button 302 is provided on the base 204 for raising the upper housing and place the mouse in a raised state. The button is on the base/bottom. The release button is activated by sliding the button 302 toward the backside of the mouse.

Figure 4:
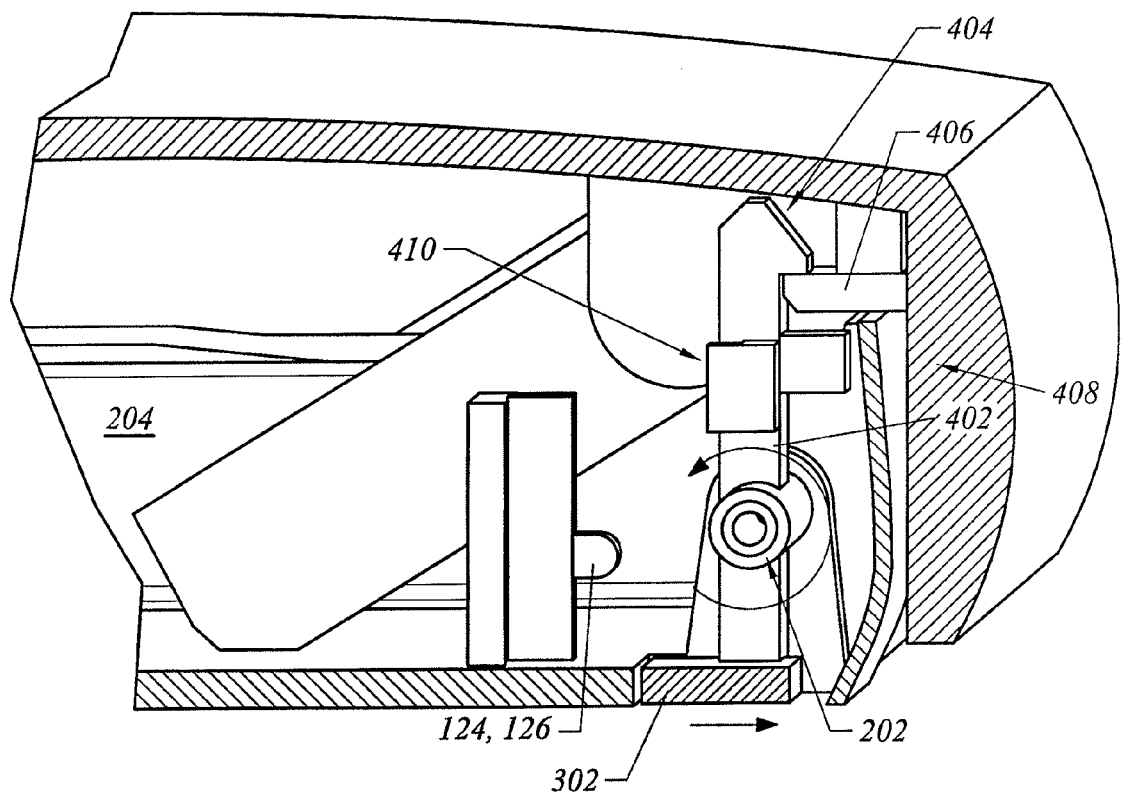
FIG. 4 illustrates a cross sectional view of the backend of the mouse according to one embodiment of the present invention.

FIG. 4 illustrates a cross sectional view of the backend of the mouse 100 according to one embodiment of the present invention. One end of a vertical pole 402 is joined to the release button 302 at about 90 degrees. The other end of the pole 402 defines a latch 404 for latching onto a protrusion 406 that extends inwardly from a backside 408 of the housing 101. The release button 302, vertical pole 402, and latch 404 together define a latch arrangement 410. The latch arrangement 410 is a unitary structure in present embodiment.

In the collapsed state, the latch 404 is latched onto the protrusion 406, so that the height or bulk of the mouse 100 is reduced for easier portability. If the user actuates the release button by sliding it toward the backend of the mouse, the button 302 and pole 402 rotates about the pivot point 202. The latch 404, in turn, moves about the pivot point and toward the front end of the mouse, releasing the latch from the protrusion 406 and enabling the housing 101 to be raised.

Figure 5A:
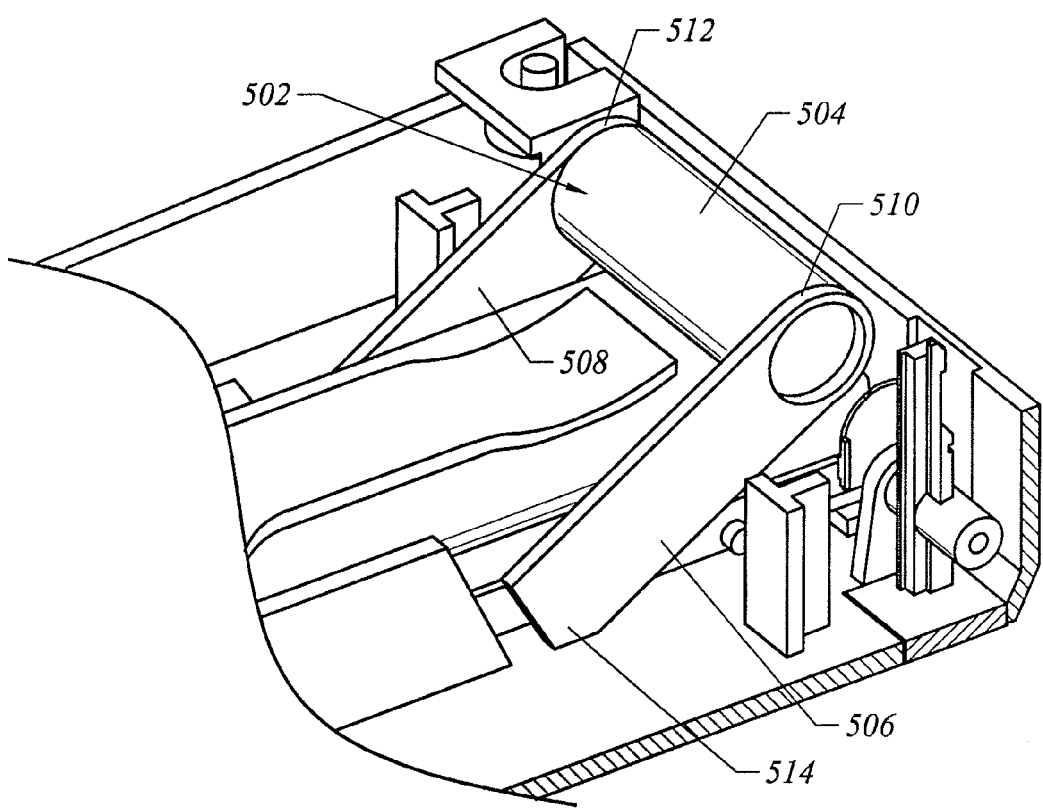
FIGS. 5A and 5B illustrate a torsion module that cooperates with the latch arrangement to raise or collapse the mouse according to one embodiment of the present invention.
Figure 5B:
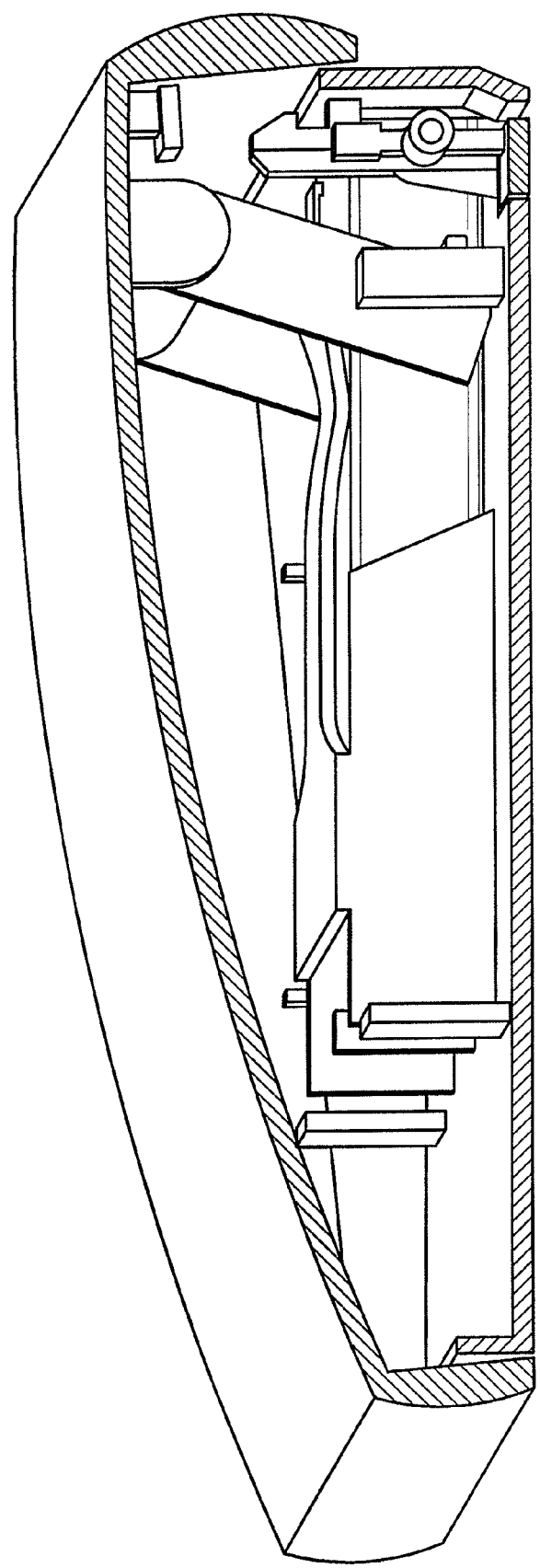

FIGS. 5A and 5B illustrate a torsion module 502 that cooperates with the latch arrangement 410 to raise or collapse the mouse according to one embodiment of the present invention. The module 502 includes a horizontal bar 504, a first arm 506, and a second arm 508. The bar 504 is joined to upper ends 510 and 512 of the arms 506 and 508. The module 502 is coupled to the upper housing 101 via the upper ends 510 and 512. Lower ends 514 of the arms are provided proximate the base. The arms are configured to slide backward to raise the housing and forward to collapse the housing. For this purpose, the module 502 includes a torsion spring (not shown) that causes the module to constantly try to rotate and push the housing 101 upward. As long as the latch is engaged to the protrusion, the housing is prevented from being raised.

Accordingly, while the mouse is in a collapsed position, the latch 404 is latched onto the protrusion 406 to prevent the housing from being pushed up. When the release button is actuated and the latch 404 is disengaged from the protrusion 406, the module 502 is free to push up the housing 101, thereby placing the mouse in the raised state. FIG. 5B illustrates a cross-sectional view of the mouse 100 in the raised state according to one embodiment.

Figure 6A:
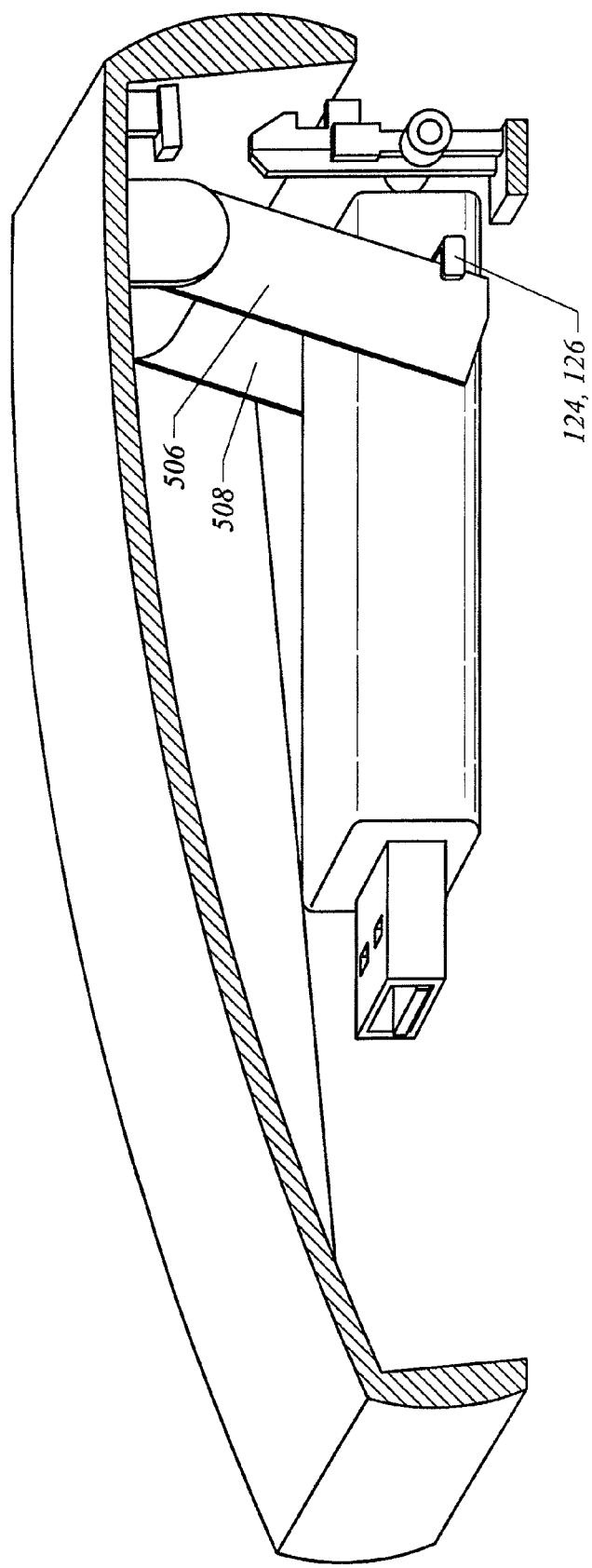
FIGS. 6A and 6B illustrate the receiver that is provided inside of the mouse according to one embodiment of the present invention.
Figure 6B:
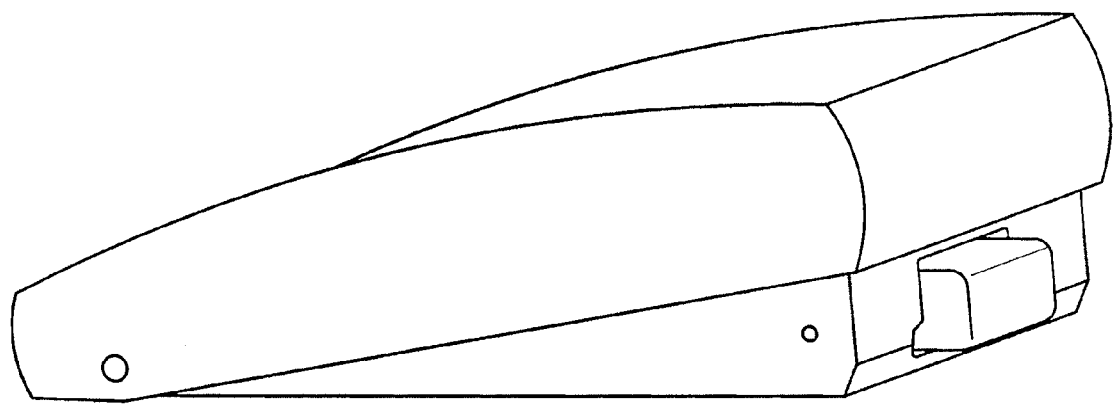

FIG. 6A illustrates the receiver 120 that is provided inside of the mouse 100 according to one embodiment of the present invention. The first and second extensions 124 and 126 of the USB receiver 120 cooperate with the arms 508 and 510 to eject the receiver 120 outward (see FIG. 6B) when the upper housing is raised, so that the user may easily pull out the receiver 120 from the mouse. That is, if the release button is actuated to place the mouse 100 in a raised state, the arms slide toward the backend of the mouse and catch the first and second extensions 124 and 126 to eject the receiver.

Figure 7:
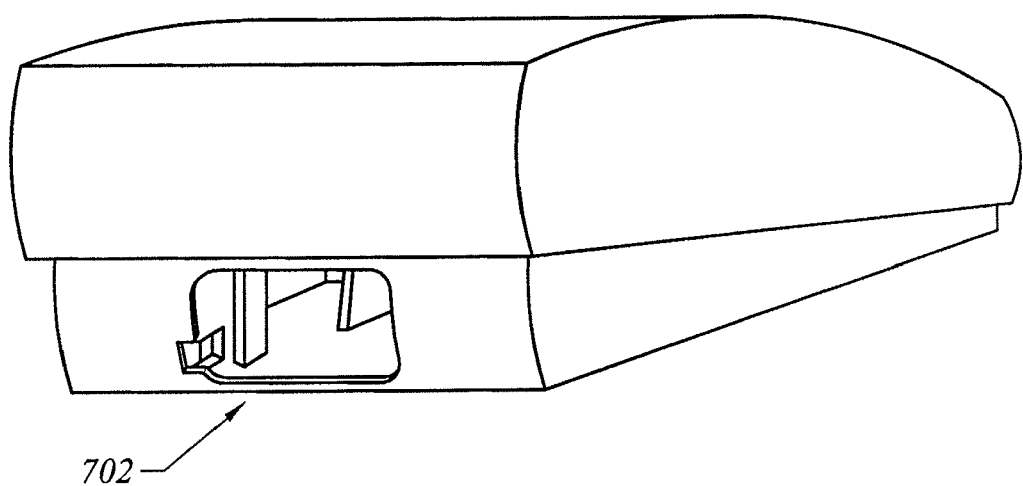
FIG. 7 illustrates the mouse of FIGS. 6A and 6B with the receiver removed, exposing an opening at the backend of the mouse according to one embodiment of the present invention.

FIG. 7 illustrates the mouse 100 with the receiver removed, exposing an opening at the backend of the mouse. Once the mouse 100 is placed in the raised state, the lower ends 514 of the arms 506 and 508 firmly contact the base to support the upper housing 101 and the weight of the user's hand.

To collapse the mouse, the receiver 120 needs to be inserted into the opening. As the receiver is being inserted, the first and second extensions 124 and 126 catch the arms 506 and 508 and push the arms forward to disengage them from the base, enabling the upper housing to be collapsed. In the present embodiment, the receiver needs to be inserted into the opening to collapse the mouse. One advantage of this feature is that the user is unlikely to forget to carry the receiver with him or her when moving from one location to another since the receiver is needed to collapse the mouse.

Figure 8:
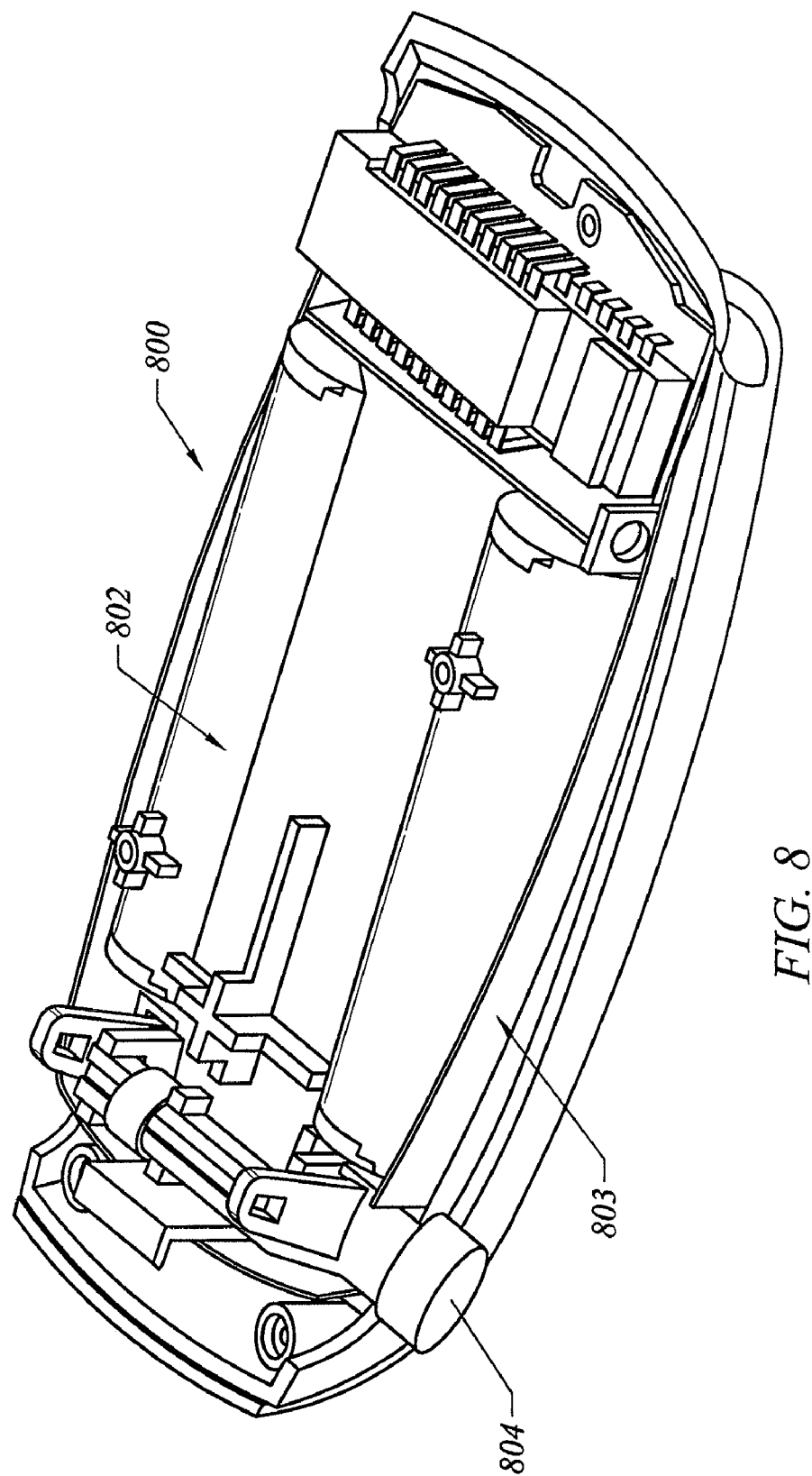
FIG. 8 illustrates a wireless mouse according to another embodiment of the present invention.
Figure 12:
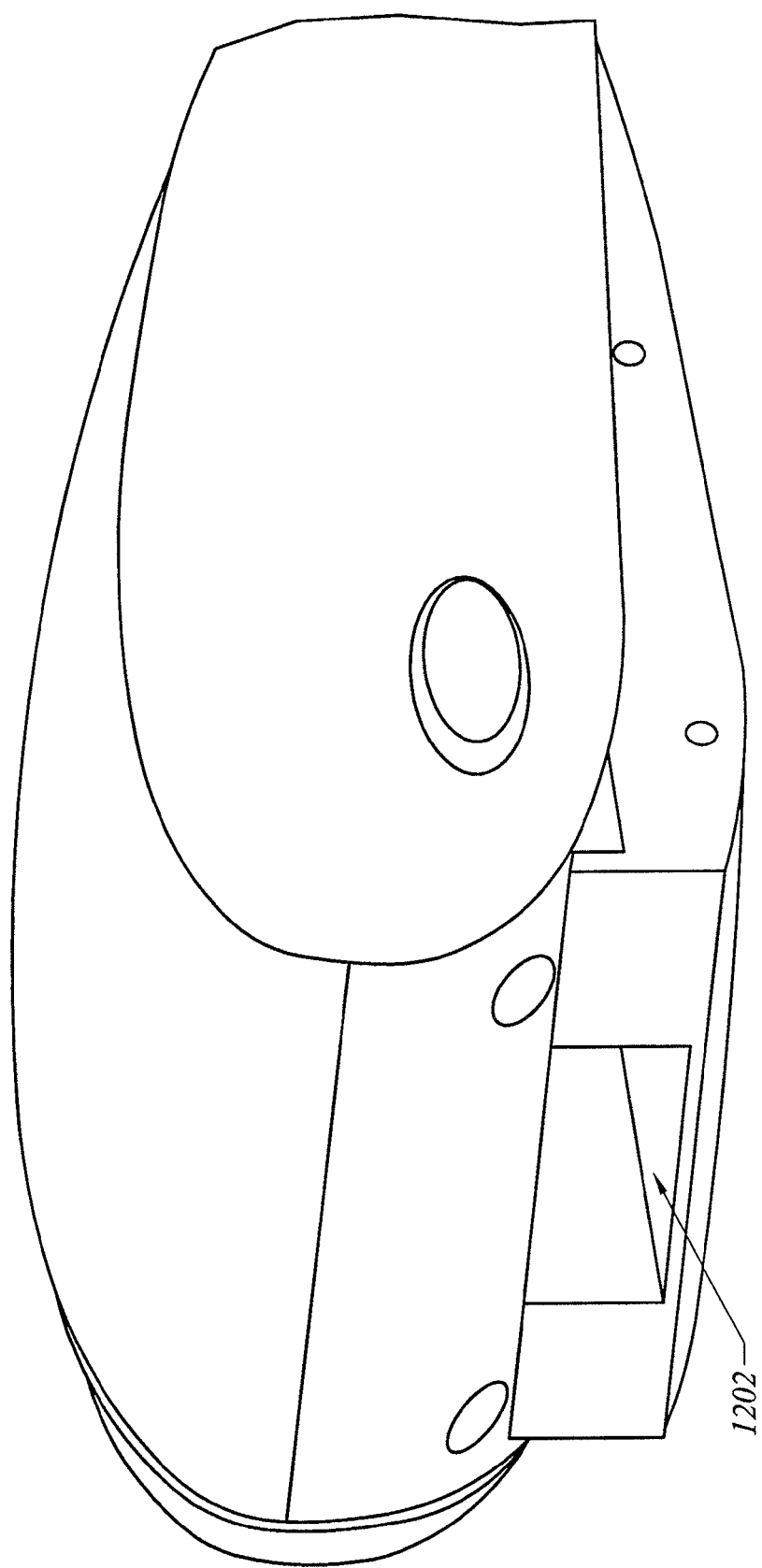
FIG. 12 illustrates a backend of the mouse according to one embodiment of the present invention.

FIG. 8 illustrates a wireless mouse 800 according to another embodiment of the present invention. A frame 803 is provided around a base assembly 802. An upper casing (FIG. 12) is attached to the frame 803 to cover the base assembly. A release button 804 is placed on a side of the frame 803 in the present embodiment.

Figure 9:
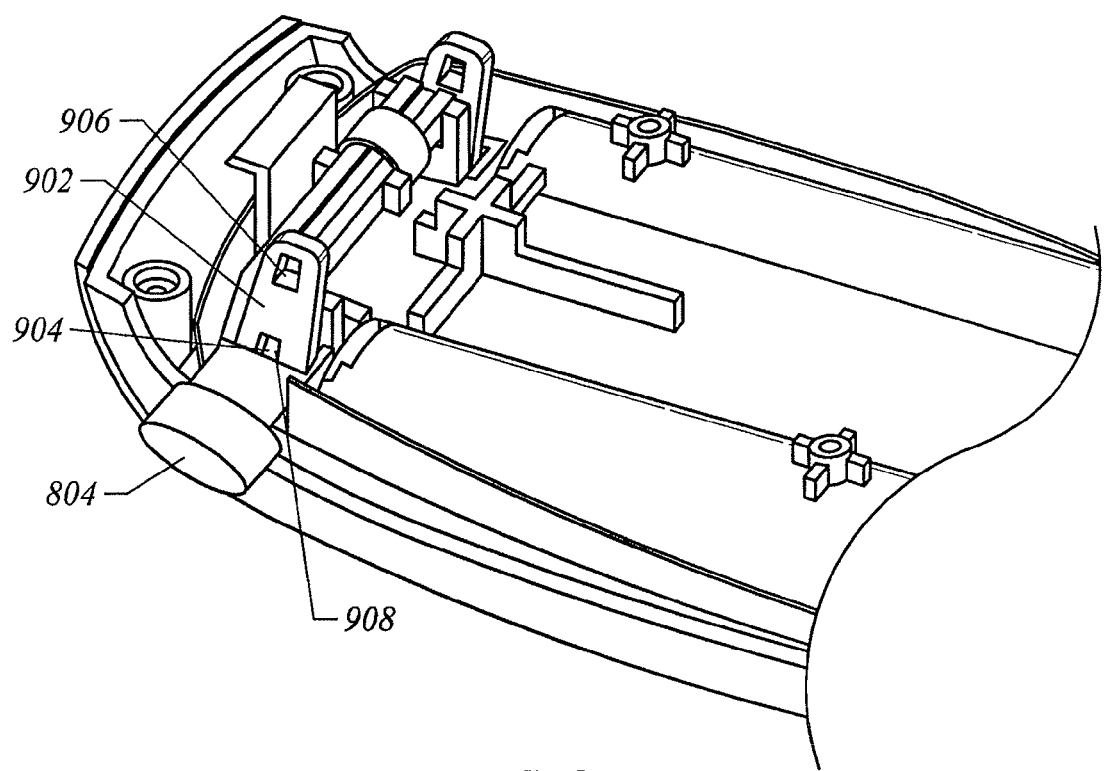
FIG. 9 illustrates a release button and a guide for raising or collapsing the mouse according to one embodiment of the present invention according to one embodiment of the present invention.

Referring to FIG. 9, an inner structure of the release button 804 is configured to slide along a guide 902 that is attached to the base assembly. The glide 902 includes a first hole 904 and a second hole 906 and extends along a vertical direction. The first hole 904 is provided below the second hole 906. When the mouse 800 is in a collapsed state, a latch 908 joined to the release button 804 engages the first hole 904 to keep the mouse in a collapsed state for easy portability.

Figure 10:
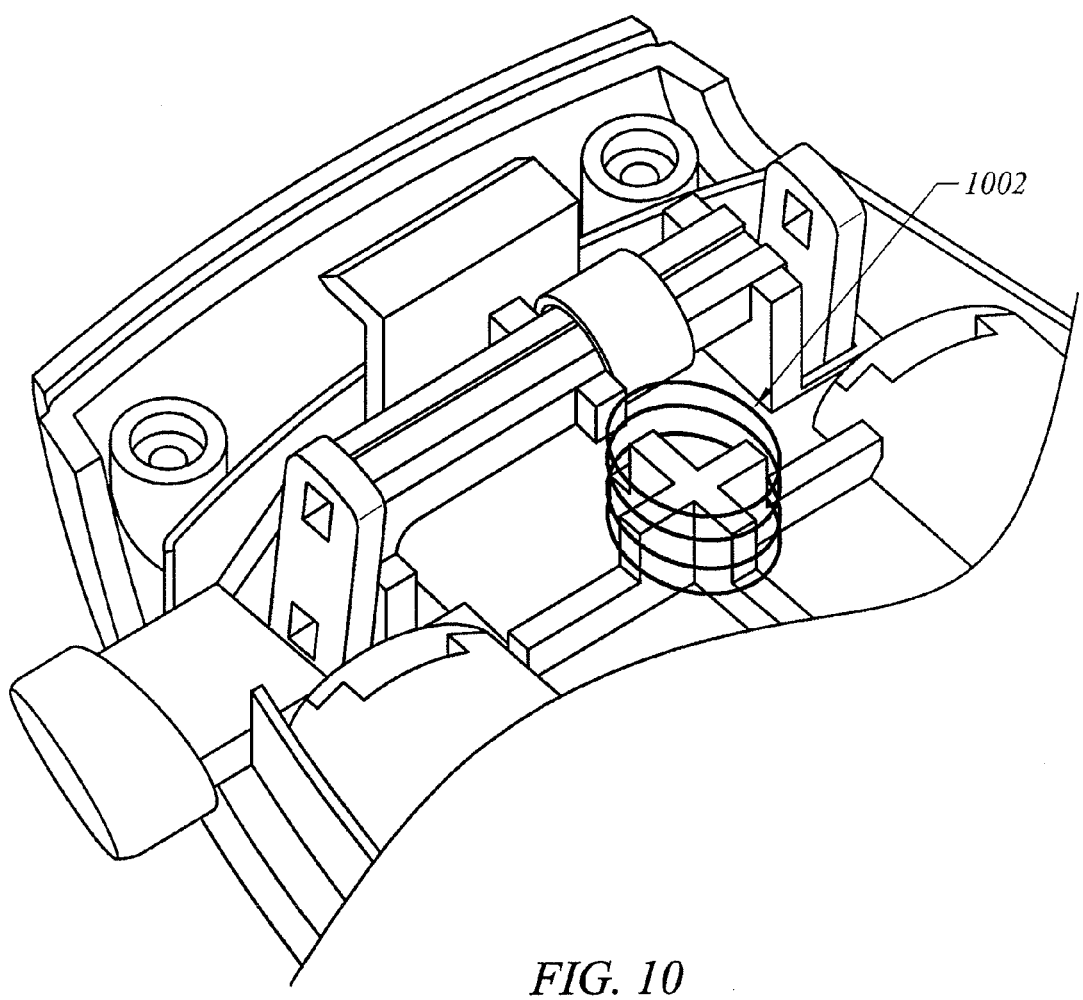
FIG. 10 illustrates a latch being disengaged from a first hole to unlock the mouse from the collapsed position according to one embodiment of the present invention.
Figure 11:
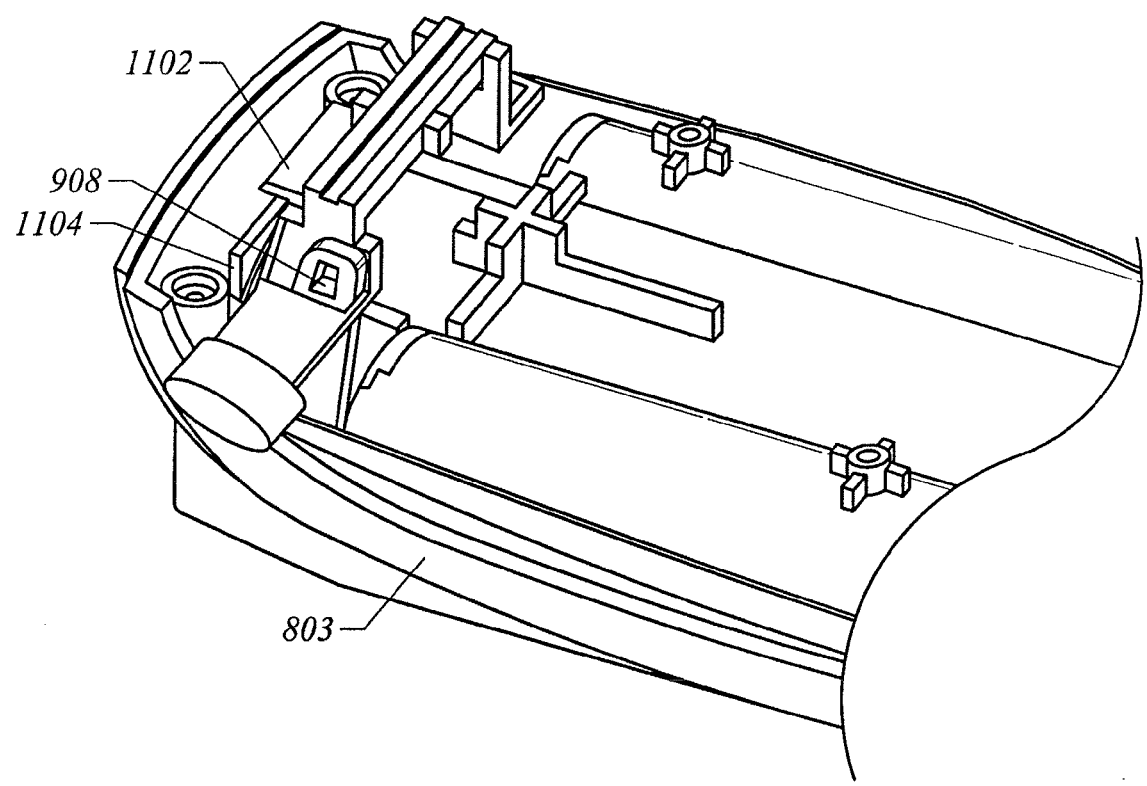
FIG. 11 illustrates a base assembly being moved downward to placed the mouse in a raised position according to one embodiment of the present invention.

If the release button 804 is actuated by pushing it inward, the latch 908 disengages from the first hole to unlock the mouse from the collapsed position (FIG. 10). A spring 1002 attached to the base assembly and the upper casing pushes the base assembly downward and the upper casing upward. The base assembly moves downward until a rib 1102 on the base assembly catches a stopper 1104 on the frame (FIG. 11).

At that point, the latch 908 snaps into the second hole 908 to lock the mouse 800 in a raised position. The release button is spring loaded for this purpose. As a result, the user is provided with an ergonomically-shaped mouse for his or her usage. In its raised position, the mouse 800 exposes an opening 1202. In the present embodiment, an internal spring (not shown) coupled to the receiver 122 ejects the receiver 122 outward via the opening 1202.

Figure 13:
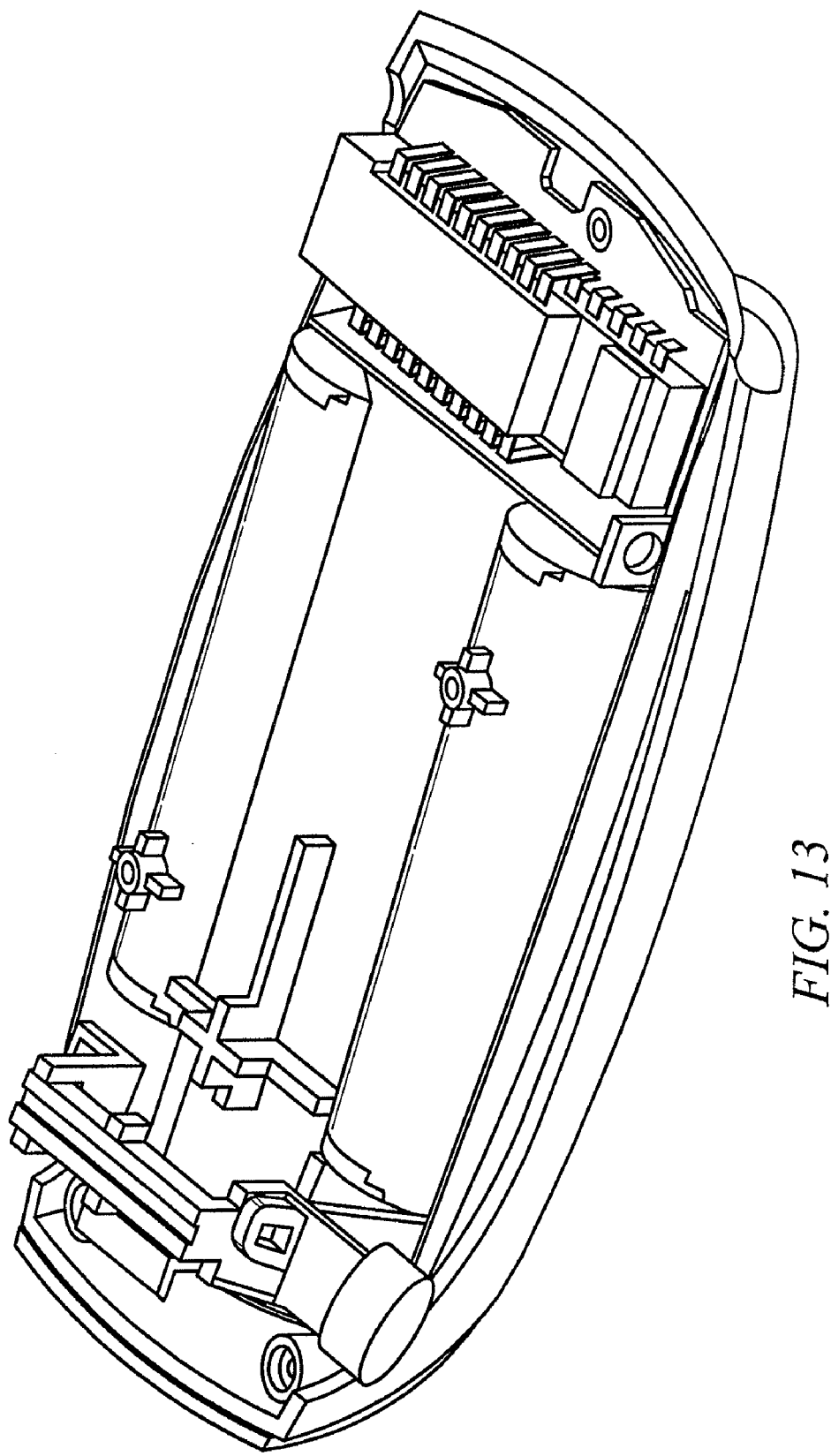
FIG. 13 illustrates a release button being actuated to collapse the mouse according to one embodiment of the present invention.

Referring to FIG. 13, once the user has finished using the mouse, the mouse may be collapsed by pressing the release button inward and pressing the upper casing downward until the latch engages the first hole. The backend of the frame then covers the opening, so that the receiver may be securely carried within the mouse. In the present embodiment, the receiver 122 does not need to be inserted into the mouse to collapse the mouse.

In one embodiment, a wireless mouse may include a user identification key (e.g., a universal serial bus key) to identify the user. The key is stored in the memory 128 provided in the receiver 120 in one embodiment. The key may be stored on the mouse in other embodiments. The wireless mouse with a universal serial bus (USB) key or tag may be used to grant access to a given computer to a user by inserting the dongle in USB port of a host. In another embodiment, a key stored in the receiver 120 or a memory within the mouse could be transmitted by an RF ID device provided in the mouse. This way, the mouse may be carried in a user's pocket and may be used to authenticate the user, e.g., allow the user's entry into a room or building as would a corporate badge.

In the present embodiment, the mouse includes a memory, logic, a transceiver, and the USB key (FIG. 13A). The USB wireless mouse would process and respond to a computer's request for authentication by providing an appropriate response. The mouse's wireless USB connection eliminates the multiple steps of plugging in a USB card, entering a password to bypass firewalls, and the like. In one embodiment, the transceiver may be used to receive information from a host.

In addition, a user's personal files and preferences may be stored in the memory 128. Using the wireless USB connection, the personal files could then be downloaded to any computer, allowing the user to access the computer using his or her user preferences. Alternatively, the mouse may simply store a link to a user-specific website with all of the user's computer preferences allowing the user to securely access his or her computer preferences and files from any computers that has a network connection.

Figure 14:
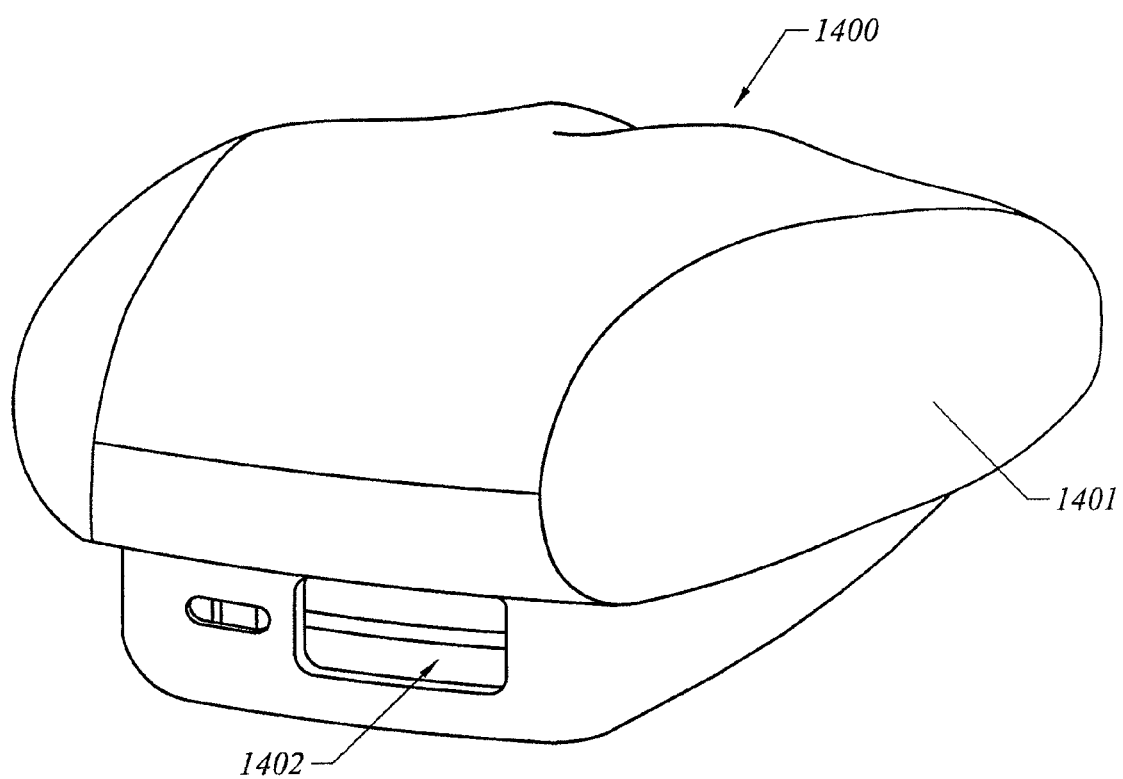
FIG. 14 illustrates an input device, e.g., a wireless mouse, according to one embodiment of the present invention.

FIG. 14 illustrates an input device, e.g., a wireless mouse, 1400 according to one embodiment of the present invention. The mouse is in a raised state. A backend of a dongle 1402 is shown at the back side of the mouse 1400. The dongle is exposed when an upper housing or case top 1401 is raised. The dongle is a USB receiver configured to be coupled to a host, so that the inputs made on the mouse may be relayed to the host via the receiver in one implementation. The dongle may be removed from the mouse by pushing the dongle inward, which actuates a push-push mechanism (FIG. 20), as explained later. In another implementation, the dongle 1402 is rechargeable batteries that are removed from the wireless mouse when the batteries are low and recharged in any available USB port. The mouse may use both batteries as well as the rechargeable/dongle batteries, where the dongle is used as a backup if the regular batteries are low, or vice versa.

In one implementation, the mouse includes two battery dongles. A first dongle is used to power the mouse while a second dongle is coupled to a power source, e.g., a USB port, to be recharged. Thereafter, the second dongle may be used to power the mouse if the first dongle needs to be recharged. The first dongle would then be coupled to the power source.

In another implementation, each of the two dongles includes a receiver and a battery. When the dongle is in the mouse only the battery is connected and it is used to power the mouse. When the dongle is inserted to the USB port of the computer, the receiver is used to receive commands from the mouse while the battery is being recharged. When the battery in the dongle in the mouse is discharged, the dongles are swapped. For traveling, both dongles are stored in the mouse.

Figure 15:
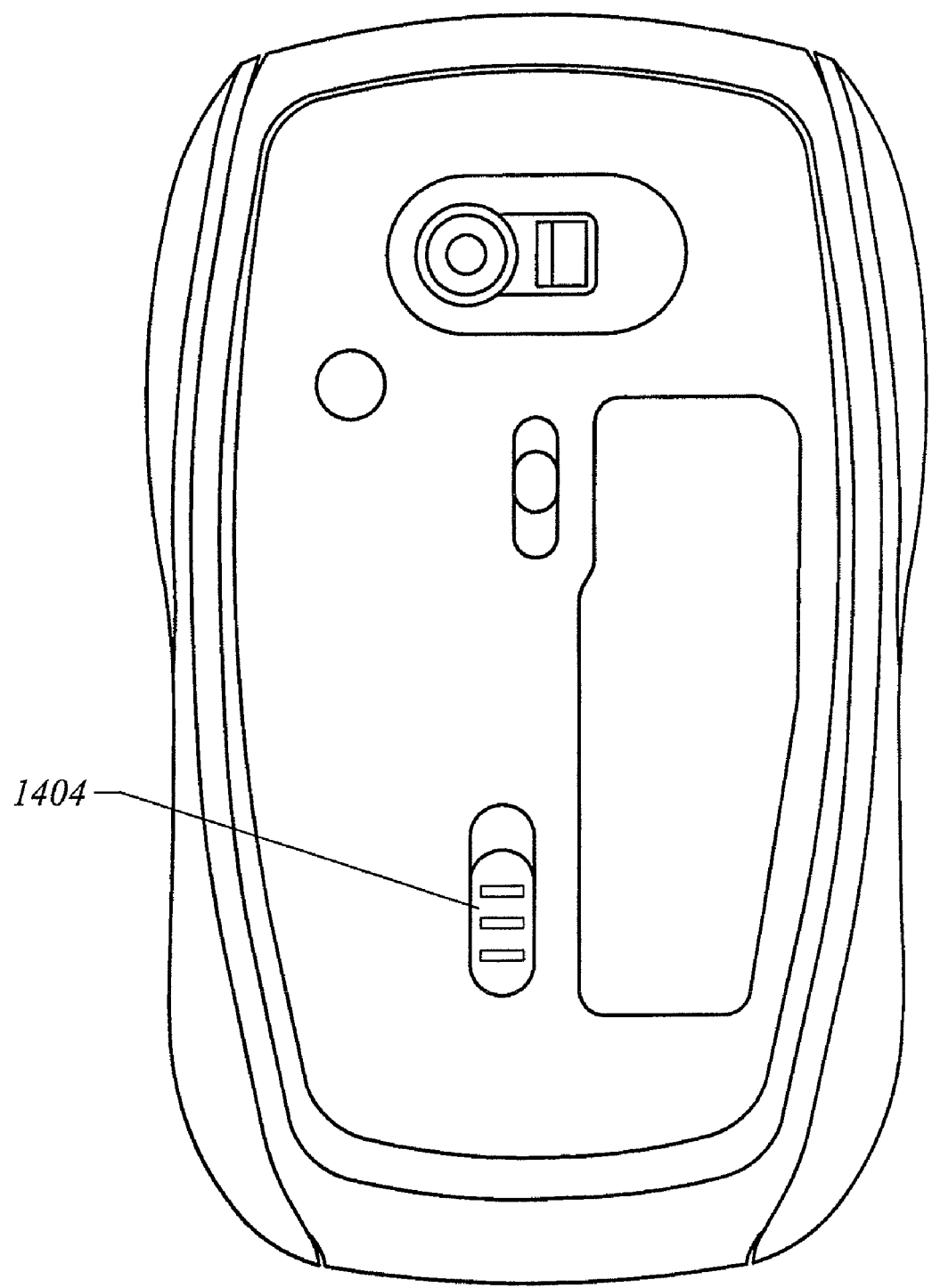
FIG. 15 illustrates a bottom view of the mouse according to one embodiment of the present invention.

FIG. 15 illustrates a bottom view of the mouse 1400 according to one embodiment of the present invention. A pop-up or release button 1404 is provided to raise or lower the upper housing of the mouse. The figure also illustrates an optical lens to receive positional information, a battery door to receive batteries, battery door button to actuate the battery door, a connect button to reinitiate connection between the mouse and a receiver coupled to the computer (e.g., a dongle), a case bottom, and a base frame.

Figure 16A:
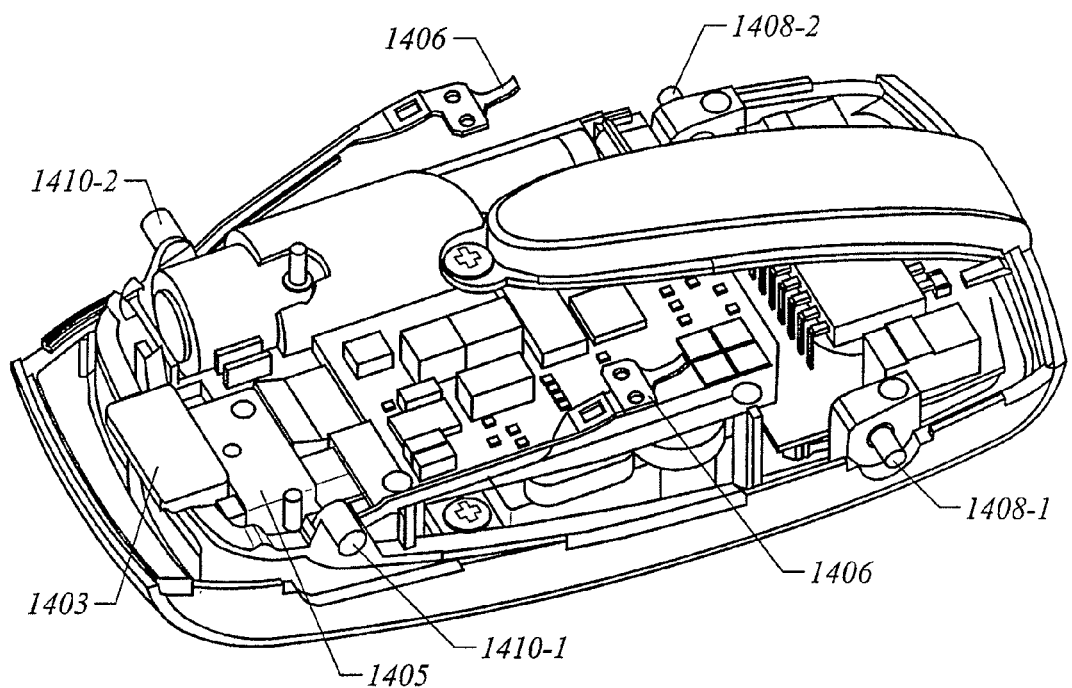
FIG. 16A illustrates the mouse with the upper housing removed according to one embodiment of the present invention.

FIG. 16A illustrates the mouse 1400 with the upper housing 1401 removed according to one embodiment of the present invention. A latch 1403 is engaged to a groove of the upper housing (or case top) when the mouse is in a collapsed state. The latch disengages the groove if the release button 1402 is pushed forward. The movement of the release button is translated to the latch by a link 1405 that joins the latch and the release button. Two pop-up springs 1406 are provided on each side of the mouse to push the upper housing upward when the latch disengages the groove of the upper housing. The upper housing rotates about first and second hinges 1408-1 and 1408-2. As a result, the backend of the upper housing is raised up. The dongle 1402 stored within the mouse is exposed (see FIG. 14).

Figure 16B:
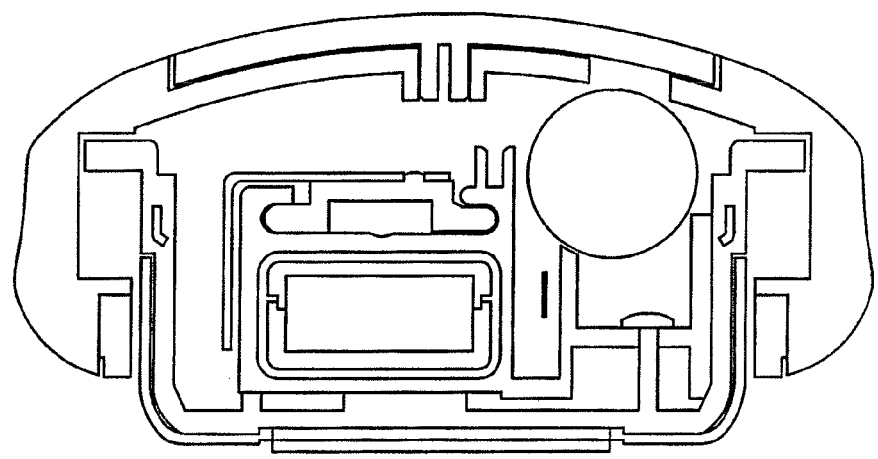
FIG. 16B illustrates cavities that are defined within the upper housing of the mouse according to one embodiment in the present invention.

The movement of the upper housing is stopped after it rotates a predetermined angle about the hinges. In the present embodiment, first and second opening travel stops 1410-1 and 1410-2 and cavities 1412-1 and 1412-2 (FIG. 16B) are provided for this purpose. The cavities are defined within the upper housing in the present embodiment. The stops are provided at the sides of the mouse and are configured to travel within cavities 1412-1 and 1412-2 until the stops contacts the upper housing, thereby preventing the upper housing from being raised further.

Figure 17:
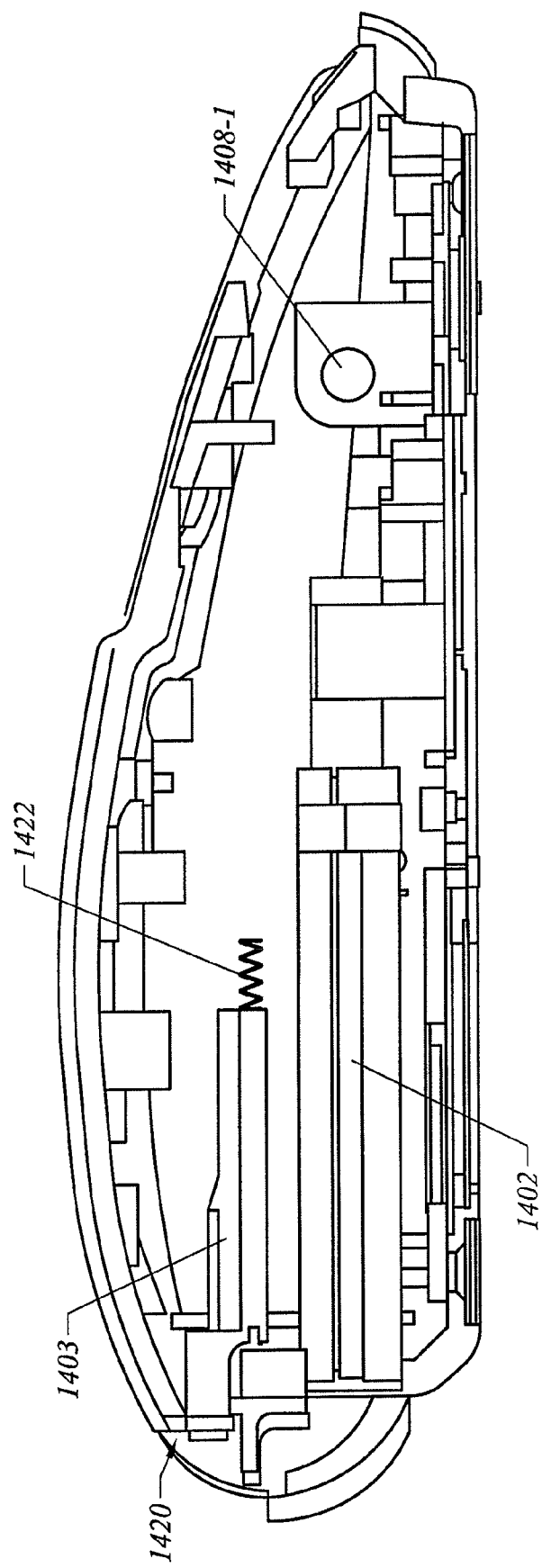
FIG. 17 illustrates a cross-sectional view of the mouse in a collapsed state according to one embodiment of the present invention.

FIG. 17 illustrates a cross-sectional view of the mouse 1400 in a collapsed state according to one embodiment of the present invention. The latch 1403 is engaged to a groove 1420 of the upper housing, so that the forces exerted by the pop-up springs 1406 would not push the upper housing upward. A latch spring 1422 is attached to one end of the latch (on the opposing side of the groove 1420) to provide the latch with a constant force that pushes the latch backward and into the groove.

Figure 18:
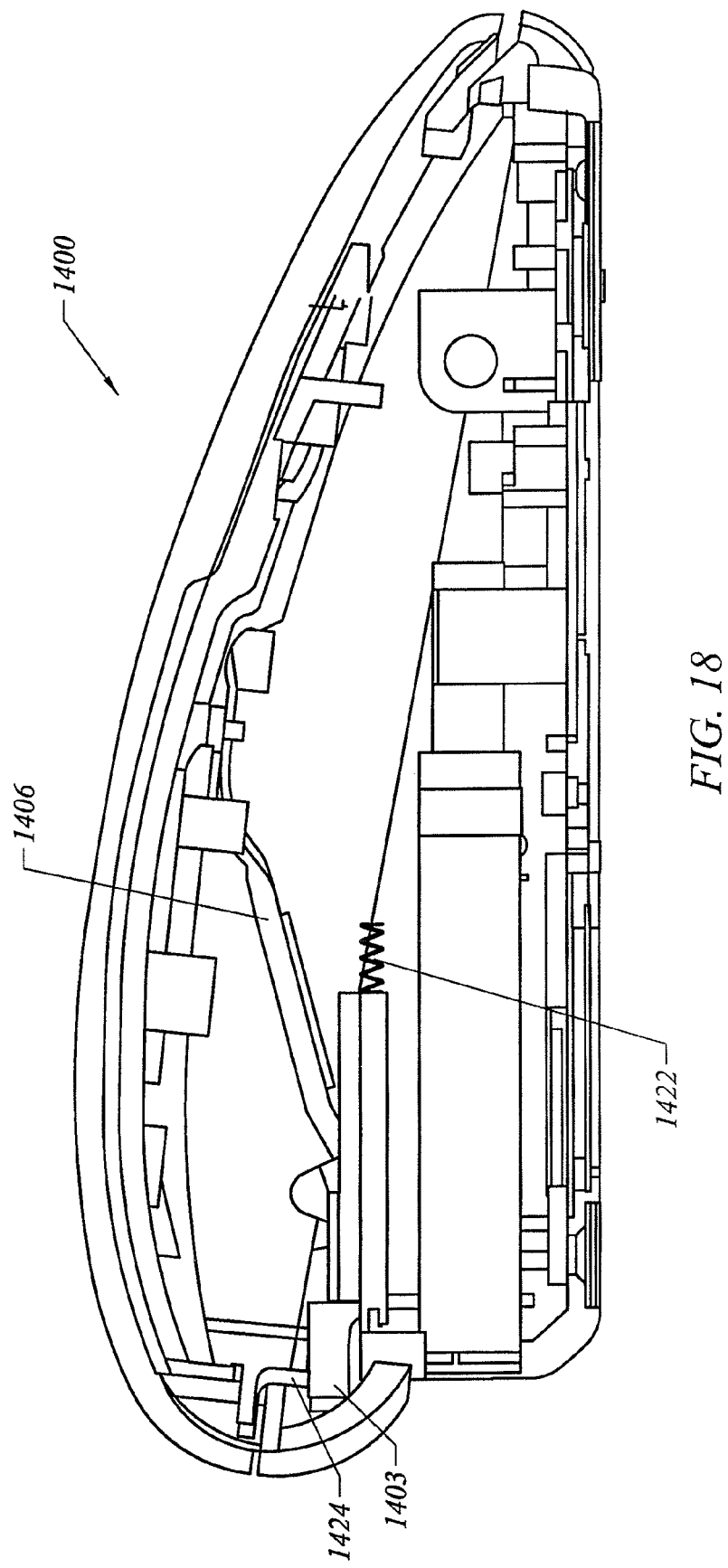
FIG. 18 illustrates a cross-sectional view of the mouse in a raised state according to one embodiment of the present invention.

FIG. 18 illustrates a cross-sectional view of the mouse 1400 in a raised state according to one embodiment of the present invention. Moving the release button forward causes the latch 1403 to move forward and disengage the groove 1420. As a result, the pop-up springs 1406 are free to push the upper housing upward.

Figure 19:
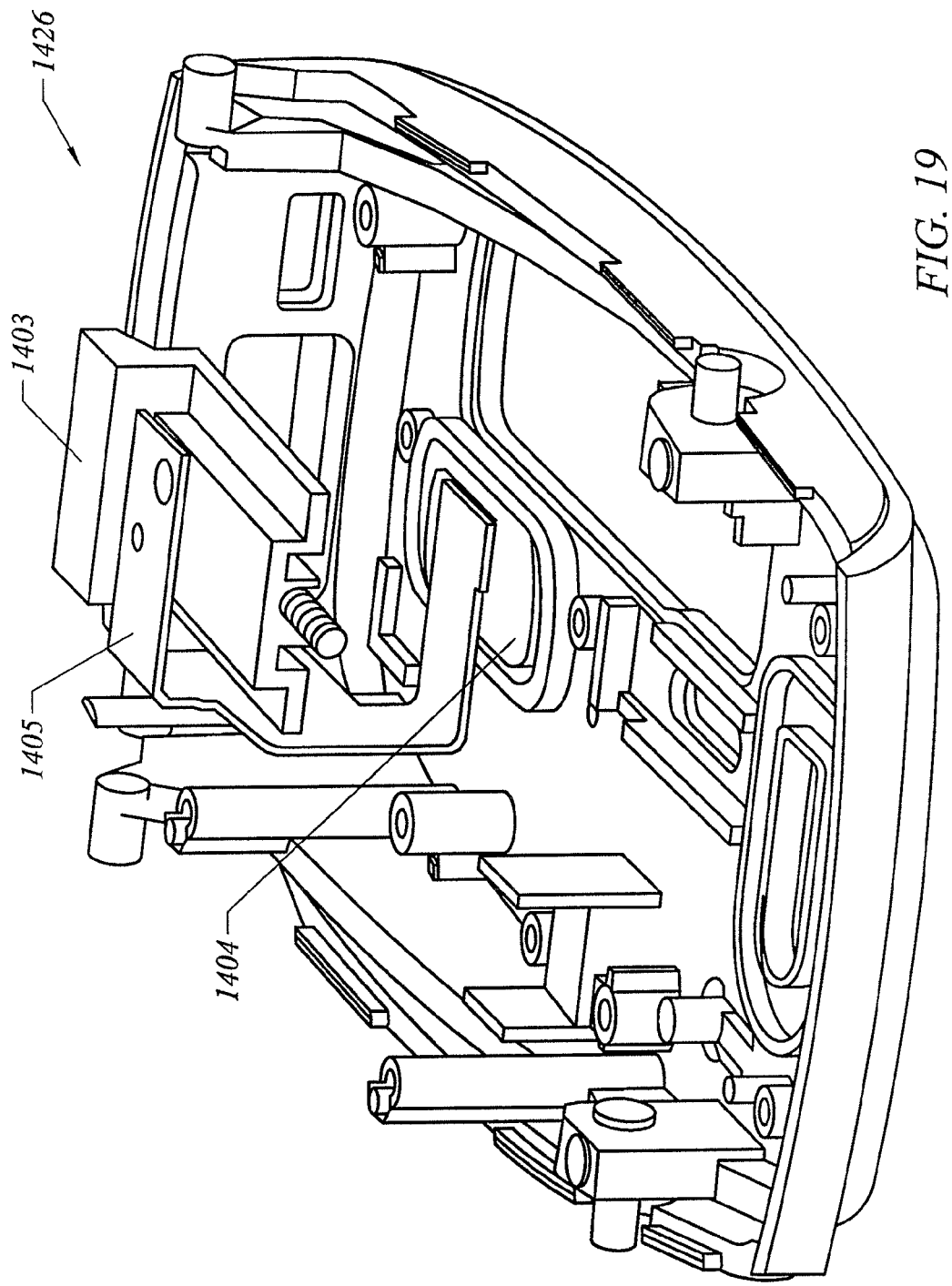
FIG. 19 illustrates a release arrangement including the latch, a pop-up or release button, and a link according to one implementation.

Once the upper housing has been raised to a given height, the latch engages a bottom of a support 1424 that is attached to the upper housing. That is, the latch spring pushes the latch under the support 1424, thereby preventing the upper housing from collapsing even when a downward force (e.g., the weight of user's hand) is applied to the upper housing. FIG. 19 illustrates a release arrangement 1426 including the latch 1403, a pop-up or release button 1404, and a link 1405 according to one implementation.

Figure 20A:
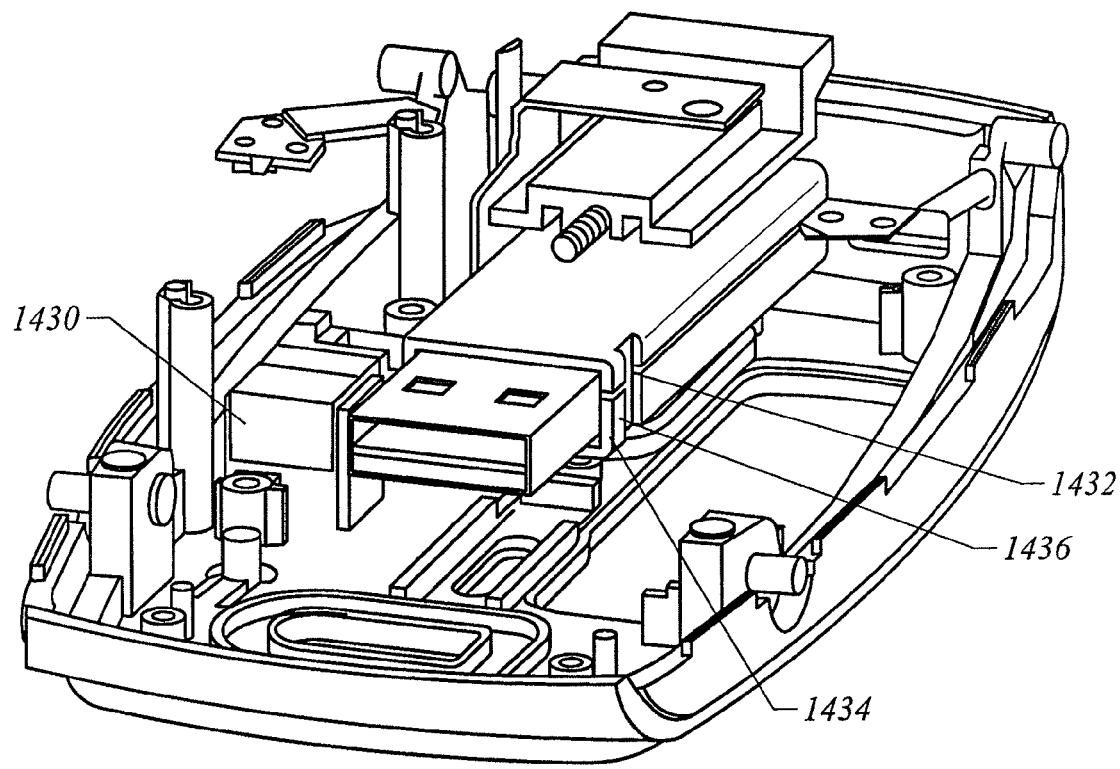
FIG. 20A illustrates a push-push mechanism engaged to the dongle according to one embodiment of the present invention.
Figure 20B:
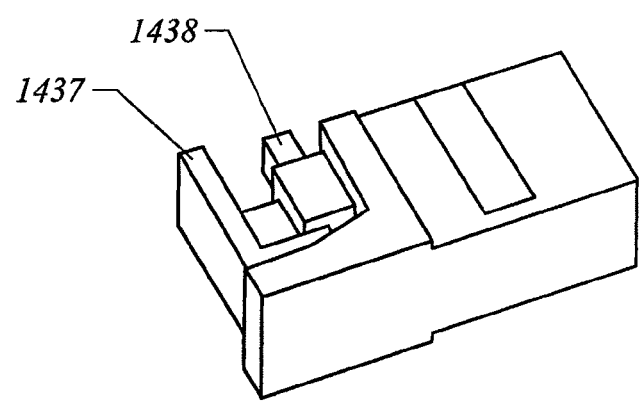
FIG. 20B illustrates a push-push mechanism including a first hook and second hook according to one embodiment of the present invention.

FIG. 20A illustrates a push-push mechanism 1430 engaged to the dongle 1402 that is placed inside of the mouse according to one embodiment of the present invention. The push-push mechanism includes a first hook 1437 and a second hook 1438 (FIG. 20B). It is a well know mechanical device. A notch on each side of the dongle is configured to receive the first hook of the push-push mechanism on the corresponding side. The notch and the hook cooperate with each other to secure the dongle inside of the mouse even when the mouse is in a raised state, exposing the backend of the dongle.

In a dongle insertion operation, an edge 1434 of the dongle engages the first hook. The edge 1434 is defined by the metal and plastic portions of the dongle. A front end of the dongle is metal and the remaining portions are plastic. The notch 1432 and the edge 1434 define a protrusion 1436 therebetween. The first hook allows the dongle to move forward until the first hook engages the notch 1432 of the dongle, and the protrusion 1436 is secured between the first and second hooks.

In a dongle removal operation, the dongle is pushed forward by pressing the backend of the dongle that is exposed when the mouse is in a raised position. The edge 1434 pushes the second hook until it reaches an end of its travel. At which point, a spring (not shown) joined to the second hook pushes the dongle backward, so that a portion of the dongle is pushed out of the mouse to enable a user to remove the dongle from the mouse.

Figure 21:
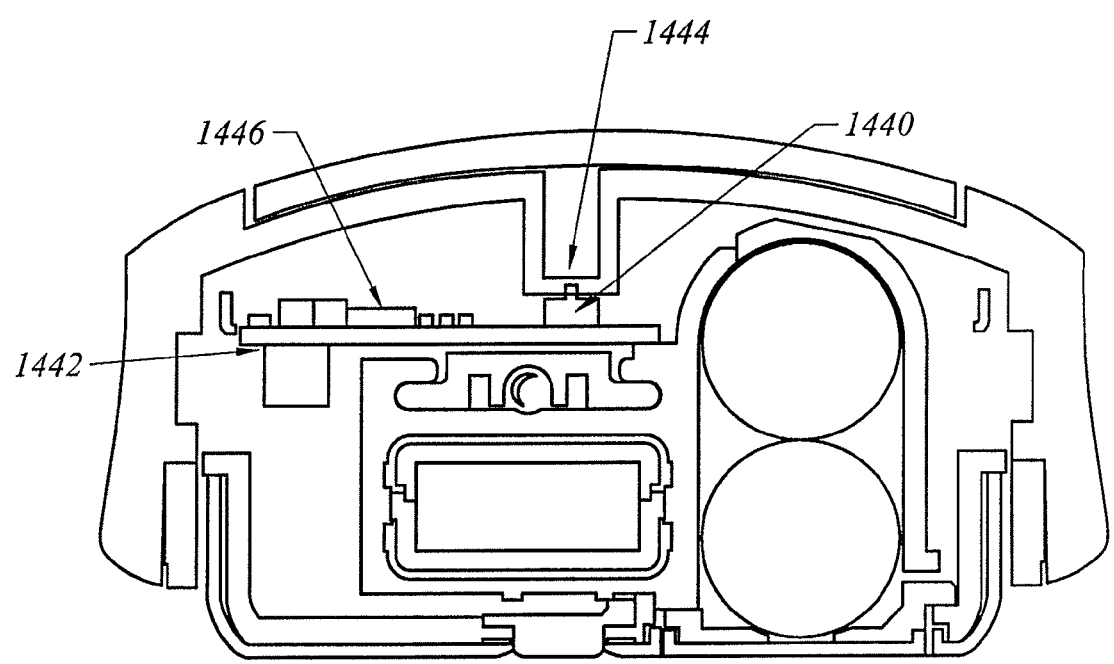
FIG. 21 illustrates an on-off switch provided within the mouse according to one embodiment of the present invention.

FIG. 21 illustrates an on-off switch 1440 provided within the mouse according to one embodiment of the present invention. The switch 1440 is placed on a printed circuit board 1442. A switch actuator 1444 is provided on the upper housing of the mouse on the opposing side of the switch. When the mouse is in a collapsed state, i.e., the upper housing or case top is in a lowered position, the actuator presses the switch downward to turn off the mouse. When the mouse is in a raised state and the upper housing is in a raised position, the actuator no longer pushes the switch downward. As a result, the mouse is turned on. That is, the mouse is activated or deactivated according to the shape of the mouse (whether is in a raised state or collapsed state). In another embodiment, the switch is turned on when it is pressed by the actuator. The resulting signal is used to turn off the power supply of the mouse.

In one embodiment, the mouse includes a transmitter 1446 on the PCB 1142. The transmitter is used to transmit commands to an internal receiver of the host directly rather than via an external dongle that is coupled to the host. Various transmission technologies may be used for this purpose including Bluetooth™. In the present implementation, the mouse does not need a dongle. Accordingly, the cavity in the mouse may be left empty or used as a storage compartment.

In another embodiment, the transmitter 1446 is a transceiver that is configured to transmit and receive information. The information transmitted may be commands to a host device or authorization information to a security device. The information received may be information prompting the input device 1400 to transmit certain information or to configure the setting of the input device.

As described above, an embodiment of the present invention relates to an input device that expands or contracts in size. Although the expansion and contraction of the input device has been described as being along a vertical direction, it may be along a horizontal direction. In one embodiment, it may be along both horizontal and vertical directions.

The present invention has been described in terms of specific embodiments. The embodiments above were described merely to illustrate the invention. For example, although the present invention has been illustrated using a wireless mouse, the present invention may also be applied to a corded mouse. The corded mouse may be a conventional mouse that has a permanent external cord. Alternatively, the mouse may have a cord that may be stored inside of the mouse when it is not in use and pulled out of the mouse to connect the mouse to a computer and then use the mouse. Accordingly, the scope of the present invention is to be determined using the appended claims.

What is claimed is:

1. A pointing device for inputting commands to a host computer, the pointing device comprising:
   a first portion of said pointing device defining one or more control components for inputting commands to the computer;
   a second portion of said pointing device, said second portion being connected at a first end to said first portion, and having a second end for contacting a supporting surface; and
   a pivoting mechanism connecting said first and second portions, said second portion pivoting about a pivot axis in said pivoting mechanism to move said pointing device between a collapsed position and an expanded position, wherein a height of said pointing device in the collapsed position is less than a height of said pointing device in the expanded position,
   wherein said pointing device is configured to input commands to said computer while said pointing device is in said expanded position;
   a removable wireless receiver dongle for attaching to said host computer and a recess in said pointing device for storing said removable wireless receiver dongle;
   wherein said pointing device can be moved to said collapsed position only after said removable wireless receiver dongle is inserted in said recess.

2. The pointing device of claim 1, wherein the pointing device is a mouse, where the pointing device is not in suitable state for inputting commands to the computer when the pointing device is in the collapsed position.

3. The pointing device of claim 1, futher comprising a battery compartment with a battery door on a bottom of said pointing device.

4. The pointing device of claim 1, wherein the pointing device is raised vertically when the pointing device is expanded.

5. The pointing device of claim 1, wherein the pointing device is lengthened horizontally when the pointing device is expanded.

6. A mouse for inputting commands to a host computer, the mouse comprising:
   a first portion of said mouse having a left select button, a right select button, and a scrolling mechanism between said right and left buttons for inputting commands to the computer;
   a second portion of said mouse, said second portion being connected at a first end to said first portion, and having a second end for contacting a supporting surface;
   a pivoting mechanism connecting said first and second portions, said second portion pivoting about a pivot axis in said pivoting mechanism to move said mouse between a collapsed position characterized by a first height of the first portion from the supporting surface and an expanded position, wherein said mouse is raised vertically when said mouse is expanded characterized by a second height of the first portion from the supporting surface greater than the first height;
   a removable USB receiver dongle having a USB connector for engaging a USB port of a computer to receive wireless signals;
   a recess in said pointing device for storing said removable USB receiver dongle; and
   a switch for turning off power to said mouse, said switch being activated when said second portion of said mouse rotates about said pivot axis to move said pointing device from said expanded to said collapsed position;
   wherein said pointing device can be moved to said collapsed position only after said removable USB receiver dongle is inserted in said recess,
   said switch being configured to turn on said power when said second portion of said mouse is rotated about said pivot axis from the collapsed position to the expanded position; and
   wherein said mouse is configured to input commands to the computer while said mouse is in the expanded position.

7. The mouse of claim 6, wherein the mouse is lengthened horizontally when the pointing device is expanded.

8. A pointing device for inputting commands to a host computer, the pointing device comprising:
   a first housing portion;
   a second housing portion having a surface including a plurality of control buttons for inputting commands to the host computer, the first and second housing portions being movably coupled to each other to enable the pointing device to be placed in a collapsed position and an expanded position; and
   a pivoting mechanism connecting said first housing portion and said second housing portion, said pivoting mechanism being operable to transition said pointing device between said collapsed position and said expanded position in response to pressure on the surface of the second housing portion;
   wherein the pointing device is configured to input commands to the computer while the pointing device is in the expanded position;
   a removable wireless receiver dongle for attaching to said host computer and a recess in said pointing device for storing said removable wireless receiver dongle;
   wherein said pointing device can be transitioned to the collapsed position only after said removable wireless receiver dongle is inserted in said recess.

9. The pointing device of claim 8, wherein said pointing device is a mouse.

10. The pointing device of claim 8, further comprising:
    a transmitter for transmitting said commands to said removable wireless receiver dongle;
    a battery compartment;
    a battery mounted in said battery compartment;
    a switch for interrupting power from said battery to said transmitter, said switch being activated when said pointing device is moved into said collapsed position; and wherein the pointing device is configured to input commands to the computer while the pointing device is in the expanded position.

11. The pointing device of claim 1, further comprising:
a transmitter for transmitting wireless signals indicating the position of said pointing device and the operation of said control components; and
a switch for turning off power to said transmitter and position sensing circuitry, said switch being activated when said second portion of said mouse rotates about said pivot axis to move said pointing device from said expanded to said collapsed position,
said switch being configured to turn on said power when said second portion of said pointing device is rotated about said pivot axis from the collapsed position to the expanded position.

12. The mouse of claim 6, further comprising:
a printed circuit board; and
a transmitter for transmitting said wireless signals indicating the position of said pointing device and the operation of said buttons and scrolling mechanism.

13. The mouse of claim 11, further comprising:
a battery compartment on an underside of said mouse; and
a battery in said battery compartment for providing power to said transmitter.

14. The mouse of claim 6, wherein the mouse is not in a suitable state for inputting commands to the computer when the pointing device is in the collapsed position.

15. The mouse of claim 6, further comprising a battery compartment with a battery door on a bottom of said pointing device.

16. The mouse of claim 6, further comprising:
a transmitter for transmitting wireless signals indicating the position of said mouse and the operation of said control components, wherein said switch turns off power to said transmitter and position sensing circuitry.

17. The pointing device of claim 8, wherein the pointing device is raised vertically when the pointing device is expanded.

18. The pointing device of claim 8, wherein the pointing device is lengthened horizontally when the pointing device is expanded.

19. The pointing device of claim 8, further comprising:
a transmitter for transmitting wireless signals indicating the position of said pointing device and the operation of said control components; and
a switch for turning off power to said transmitter and position sensing circuitry, said switch being activated when said second portion of said mouse rotates about said pivot axis to move said pointing device from said expanded to said collapsed position,
said switch being configured to turn on said power when said second portion of said pointing device is rotated about said pivot axis from the collapsed position to the expanded position.

\* \* \* \* \*